US012205533B2

(12) United States Patent
Deng et al.

(10) Patent No.: US 12,205,533 B2
(45) **Date of Patent: *Jan. 21, 2025**

(54) DISPLAY PANEL AND LIGHT EMITTING SIGNAL GENERATOR THEREOF

(71) Applicant: AUO Corporation, Hsinchu (TW)

(72) Inventors: Ming-Yang Deng, Hsinchu (TW); Ming-Hung Chuang, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/491,821

(22) Filed: Oct. 23, 2023

(65) Prior Publication Data

US 2024/0161686 A1 May 16, 2024

Related U.S. Application Data

(63) Continuation of application No. 18/086,650, filed on Dec. 22, 2022, now Pat. No. 11,830,419.

(30) Foreign Application Priority Data

Nov. 10, 2022 (TW) ................................ 111142972

(51) Int. Cl.
*G09G 3/32* (2016.01)

(52) U.S. Cl.
CPC ....... *G09G 3/32* (2013.01); *G09G 2310/0243* (2013.01); *G09G 2320/043* (2013.01)

(58) Field of Classification Search
CPC ............................................. G09G 2310/0243
See application file for complete search history.

(56) References Cited

U.S. PATENT DOCUMENTS

| | | | | |
|---|---|---|---|---|
| 9,129,562 B2 * | 9/2015 | Jang | G11C 19/184 | |
| 9,198,260 B1 * | 11/2015 | Zhou | G09G 3/3266 | |
| 9,277,622 B2 * | 3/2016 | Kim | G09G 3/3233 | |
| 10,043,432 B2 * | 8/2018 | Lee | G11C 19/184 | |
| 10,217,410 B2 * | 2/2019 | Moon | G09G 3/325 | |
| 10,453,386 B2 * | 10/2019 | Jang | G09G 3/3266 | |
| 10,643,546 B2 * | 5/2020 | Lee | G09G 3/3266 | |
| 10,762,853 B2 * | 9/2020 | Kong | G09G 3/3291 | |
| 11,282,454 B2 * | 3/2022 | Yu | G09G 3/3233 | |
| 11,430,365 B2 * | 8/2022 | Yuan | G11C 19/28 | |
| 11,475,838 B2 * | 10/2022 | Kim | G09G 5/14 | |
| 11,615,728 B2 * | 3/2023 | Yuan | G11C 19/287 | 345/212 |
| 11,640,793 B2 * | 5/2023 | Kim | G09G 3/3233 | 345/213 |
| 2021/0366402 A1 * | 11/2021 | In | G09G 3/3266 | |
| 2022/0068202 A1 * | 3/2022 | Kim | G09G 5/14 | |

(Continued)

*Primary Examiner* — Gene W Lee
(74) *Attorney, Agent, or Firm* — JCIPRNET

(57) ABSTRACT

A display panel and a light emitting signal generator thereof are provided. The light emitting signal generator includes an output stage circuit, a first control signal generator, a second control signal generator, a switch, and a capacitor. The output stage circuit generates a light emitting signal according to a first control signal and a second control signal. The first control signal generator generates the first control signal at a first control end. The second control signal generator generates the second control signal at a second control end. The switch is coupled between the first control end and the output stage circuit. The first capacitor is coupled to the first control end.

10 Claims, 4 Drawing Sheets

(56) References Cited

U.S. PATENT DOCUMENTS

| | | | | |
|---|---|---|---|---|
| 2023/0178027 | A1 * | 6/2023 | In | G11C 19/287 345/212 |
| 2024/0096276 | A1 * | 3/2024 | Byun | G09G 3/32 |

* cited by examiner

DISPLAY PANEL AND LIGHT EMITTING SIGNAL GENERATOR THEREOF

CROSS-REFERENCE TO RELATED APPLICATION

This application is a continuation application of and claims the priority benefit of U.S. application Ser. No. 18/086,650, filed on Dec. 22, 2022, which claims the priority benefit of Taiwan application serial no. 111142972, filed on Nov. 10, 2022. The entirety of each of the above-mentioned patent applications is hereby incorporated by reference herein and made a part of this specification.

BACKGROUND OF THE INVENTION

Field of the Invention

The invention relates to a display panel and a light emitting signal generator, and more particularly, to a display panel and a light emitting signal generator that may improve reliability.

Description of Related Art

In the current light-emitting diode display device, the enabling period of the light emitting signal for lighting the light-emitting diode is shortened. The phenomenon that the enabling period of the light emitting signal is shortened results in the light emitting signal generator maintaining the stabilization period longer and the generated light emitting signal maintaining high voltage longer. As a result, some elements in the light emitting signal generator are in a high-voltage bias state for a long time, thus accelerating the aging rate of the elements and reduces the reliability of the display device.

SUMMARY OF THE INVENTION

The invention provides a display panel and a light emitting signal generator that may effectively improve the reliability of a display device.

A light emitting signal generator of the invention includes an output stage circuit, a first control signal generator, a second control signal generator, a switch, and a capacitor. The output stage circuit generates a light emitting signal according to a first control signal and a second control signal. The first control signal generator is coupled to the output stage circuit and a first control end and generates a first control signal at the first control end according to a reference light emitting signal, a first clock signal, a first reference voltage, and a second reference voltage. The second control signal generator is coupled to the output stage circuit and a second control end and generates a second control signal at the second control end according to the reference light emitting signal, the first clock signal, the first reference voltage, and the second reference voltage. The switch is coupled between the first control end and the output stage circuit, wherein a control end of the switch receives the second reference voltage. The first capacitor has a first end coupled to the first control end, wherein a second end of the first capacitor receives a third reference voltage.

A display panel of the invention includes a light emitting driver. The light emitting driver includes the plurality of light emitting signal generators above.

Based on the above, in the light emitting signal generator of the invention, the switch and the first capacitor are disposed between the output stage circuit and the first control end. The switch may be used to cut off or turn on the connection path between the first control end and the output stage circuit. In particular, when the switch is turned on, the first capacitor and the capacitor in the output stage circuit may form a voltage divider circuit, thereby reducing the voltage to which the output stage circuit is subjected, and thereby reducing the risk of damage to the output stage circuit. When the switch is cut off, the voltage on the first control end may be not affected by the jitter of the clock signal, and the risk of damage to the circuit elements of the first control signal generator and the second control signal generator is reduced.

DESCRIPTION OF THE EMBODIMENTS

Figure 1:
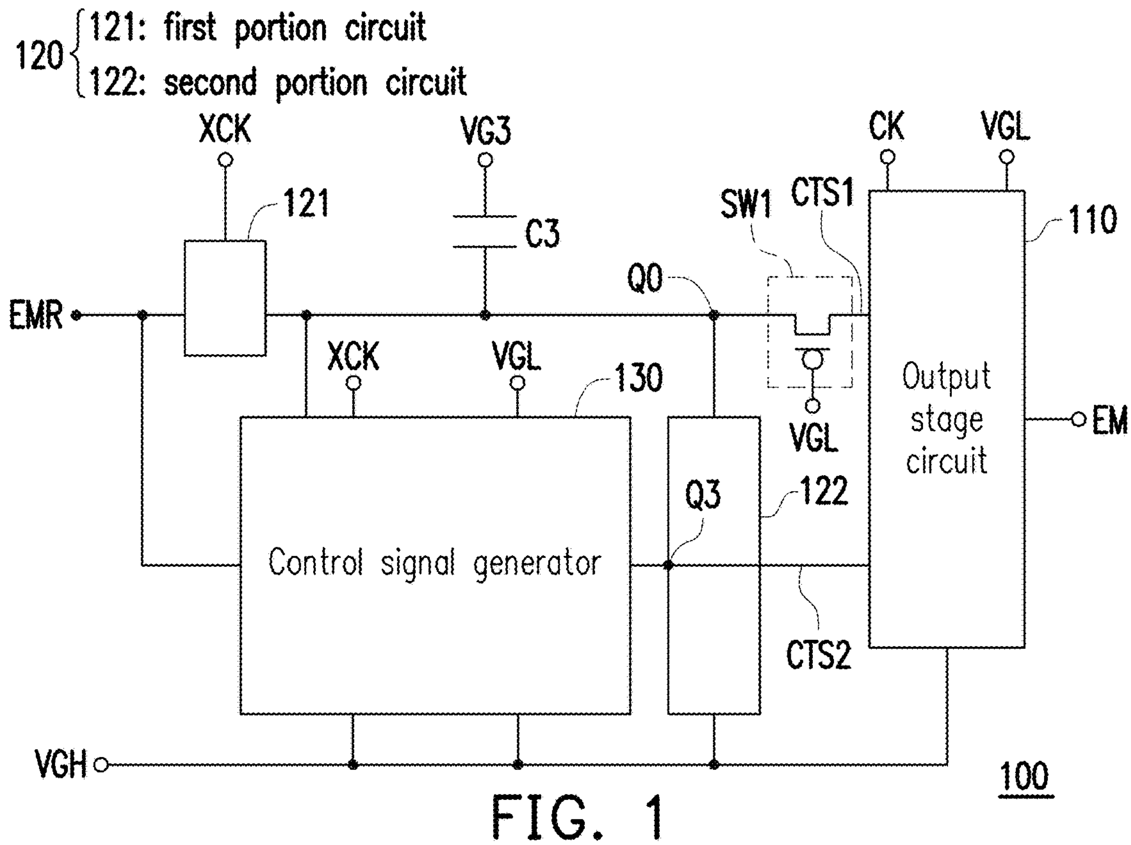
FIG. 1 shows a schematic diagram of a light emitting signal generator of an embodiment of the invention.

FIG. 1 shows a schematic diagram of a light emitting signal generator of an embodiment of the invention. A light emitting signal generator 100 includes an output stage circuit 110, control signal generators 120 and 130, a switch SW1, and a capacitor C3. The output stage circuit 110 generates a light emitting signal EM according to control signals CTS1 and CTS2 and a clock signal CK. In particular, the output stage circuit 110 may pull down the light emitting signal EM to a reference voltage VGL according to the control signal CTS1, or pull up the light emitting signal EM to a reference voltage VGH according to the control signal CTS2. In particular, the reference voltage VGH is higher than the reference voltage VGL.

The control signal generator 120 is coupled to a first control end Q0 and the output stage circuit 110. In the present embodiment, the control signal generator 120 includes a first portion circuit 121 and a second portion circuit 122. The control signal generator 120 may generate the control signal CTS1 at the first control end Q0 according to a reference light emitting signal EMR, a clock signal XCK, the reference voltages VGH and VGL, and provide the control signal CTS1 to the output stage circuit 110 via the switch SW1. In particular, the clock signal XCK is an inverse signal of the clock signal CK.

The control signal generator 130 is coupled to a second control end Q3 and the output stage circuit 110. The control signal generator 130 may generate the control signal CTS2 at the second control end Q3 according to the reference light emitting signal EMR, the clock signal XCK, the reference voltages VGH and VGL, and provide the control signal CTS2 to the output stage circuit 110.

It should be noted that the first end of the capacitor C3 is coupled to the first control end Q0, and the second end of the capacitor C3 may receive a reference voltage VG3. In particular, the reference voltage VG3 is a constant voltage, such as the reference voltage VGH, or any voltage lower than the reference voltage VGH. In addition, the switch SW1 is coupled between the first control end Q0 and the output stage circuit 110. The control end of the switch SW1 receives the reference voltage VGL. The control signal generator 120 may provide the control signal CTS1 to the output stage circuit 110 when the switch SW1 is turned on. When the switch SW1 is turned off, the connection path of the first control end Q0 and the output stage circuit 110 may be cut off.

In an embodiment of the invention, when the light emitting signal generator 100 is operated in an output period, the switch SW1 may be turned off. At the same time, based on the disconnection between the first control end Q0 and the output stage circuit 110, the voltage on the first control end Q0 may be not affected by the periodic transition action of the clock signal CK on the output stage circuit 110, and may be maintained at a fixed voltage level. In this way, the aging speed of the circuit elements in the second portion circuit 122 in the control signal generator 120 may be slowed down. Moreover, the output stage circuit 110 may have a relatively stable driving capability.

Moreover, when the light emitting signal generator 100 is operated in a stabilization period, the switch SW1 may be turned on. Under such conditions, the capacitor C3 may be coupled to a capacitor inside the output stage circuit 110 via the switch SW1 to form a voltage divider circuit. In this way, the output stage circuit 110 receives the voltage on the end of the control signal CTS1, and may reduce the fluctuation caused by the periodic transition action of the clock signal CK due to the voltage dividing effect of the voltage divider circuit, so as to increase the stability of the output stage circuit 110.

Figure 2:
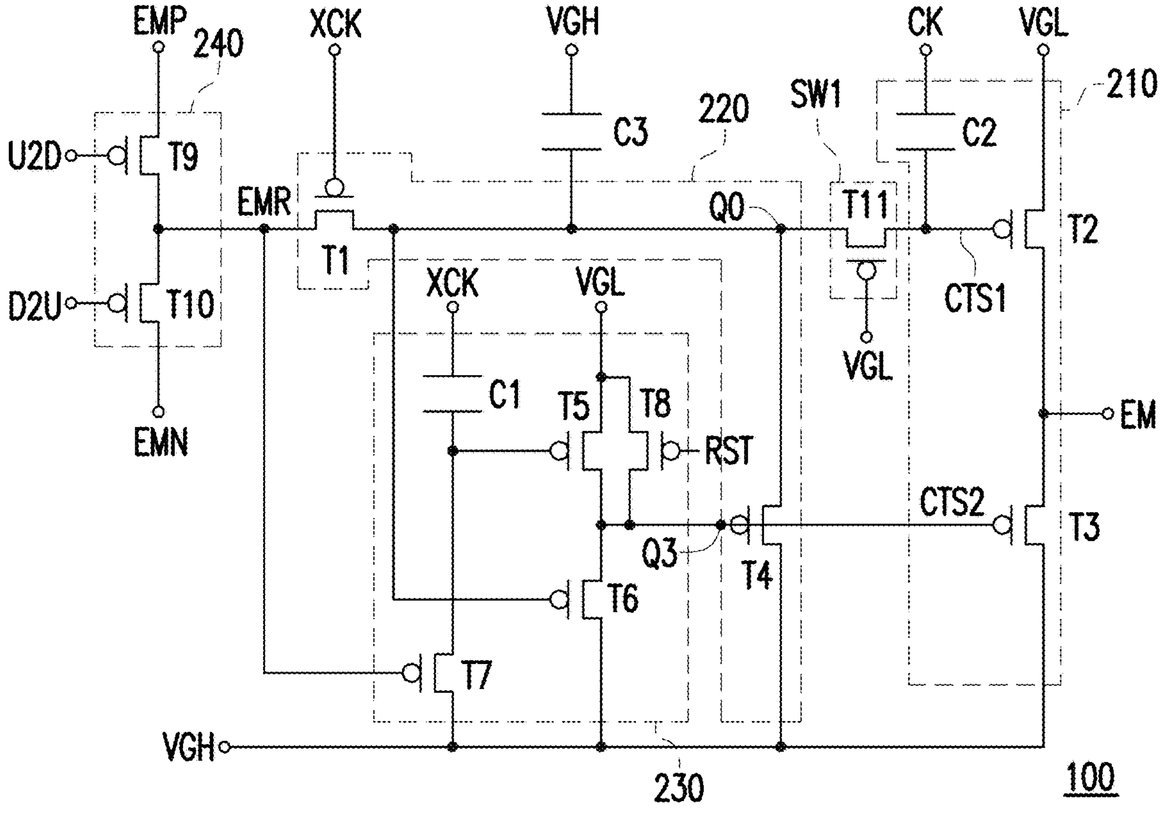
FIG. 2 shows a schematic circuit diagram of a light emitting signal generator of another embodiment of the invention.

For details of the light emitting signal generator of the invention, reference may be made to the schematic circuit diagram of a light emitting signal generator of another embodiment of the invention shown in FIG. 2. In FIG. 2, a light emitting signal generator 200 includes an output stage circuit 210, control signal generators 220 and 230, the switch SW1, the capacitor C3, and a signal selector 240.

In the present embodiment, the signal selector 240 includes transistors T9 and T10. The first end of the transistor T9 receives the pre-stage light emitting signal EMP, and the second end of the transistor T9 is coupled to the second end of the transistor T10. The first end of the transistor T10 receives a post-stage light emitting signal EMN. The control ends of the transistors T9 and T10 respectively receive selection signals U2D and D2U. When the light emitting signal generator 200 is implemented in a display panel, the light emitting signal generator 200 and a plurality of light emitting signal generators having the same circuit architecture may be disposed in the same display panel. The selection signals U2D and D2U are used to set the scanning directions of the plurality of light emitting signal generators in the display panel. In particular, the selection signals U2D and D2U are complementary. In the present embodiment, when the selection signal U2D is a logic low voltage (the selection signal D2U is a logic high voltage), the signal selector 240 selects and outputs the pre-stage light emitting signal EMP as the reference light emitting signal EMR. In contrast, when the selection signal U2D is a logic high voltage (the selection signal D2U is a logic low voltage), the signal selector 240 selects and outputs the post-stage light emitting signal EMN as the reference light emitting signal EMR.

In addition, the control signal generator 220 includes transistors T1 and T4. An end of the transistor T1 receives the reference light emitting signal EMR, and another end of the transistor T1 is coupled to the first control end Q0 and coupled to the switch SW1. An end of the transistor T4 is coupled to the first control end Q0, and another end of the transistor T4 receives the reference voltage VGH. The control end of the transistor T1 receives the clock signal XCK, and the control end of the transistor T4 is coupled to the second control end Q3 to receive the second control signal CTS2.

In the present embodiment, the transistor T1 may be turned on or turned off periodically according to the clock signal XCK. When the transistor T1 is turned on, the transistor T1 may transmit the reference light emitting signal EMR as a basis for generating the first control signal CTS1.

The control signal generator 230 includes transistors T5 to T8 and a capacitor C1. The first end of the transistor T5 receives the reference voltage VGL, the control end of the transistor T5 is coupled to the coupling end of the capacitor C1 and the transistor T7, and the second end of the transistor T5 is coupled to the second control end Q3. The transistor T8 is coupled in parallel with the transistor T5, and the control end of the transistor T8 receives a reset voltage RST. The first end of the transistor T6 is coupled to the second end of the transistor T5, the second end of the transistor T6 receives the reference voltage VGH, and the control end of the transistor T6 is coupled to the first control end Q0. In the present embodiment, when the transistor T6 is turned on, the transistor T6 is used to pull up the second control signal CTS2 according to the reference voltage VGH. Each of the transistors T5 and T8 may pull down the second control signal CTS2 according to the reference voltage VGH when turned on.

Moreover, the first end of the transistor T7 is coupled to the capacitor C1 and the control end of the transistor T5, the second end of the transistor T7 receives the reference voltage VGH, and the control end of the transistor T7 receives the reference light emitting signal EMR. Another end of the capacitor C1 receives the clock signal XCK. When the reference light emitting signal EMR is a logic low voltage, the transistor T7 may be turned on. The signal on the control end of the transistor T5 may remain equal to the reference voltage VGH. When the reference light emitting signal EMR is a logic high voltage, the transistor T7 may be turned off. The signal on the control end of the transistor T5 may be a periodic clock signal according to the clock signal XCK.

An end of the capacitor C3 is coupled to the first control end Q0. In the present embodiment, another end of the capacitor C3 may receive the reference voltage VGH. The switch SW1 is formed by the transistor T11. An end of the transistor T11 is coupled to the first control end Q0, another end of the transistor T11 is coupled to the output stage circuit 210, and the control end of the transistor T11 receives the reference voltage VGL.

In the present embodiment, the output stage circuit 210 includes transistors T2, T3, and a capacitor C2. The first end of the transistor T2 receives the reference voltage VGL, the second end of the transistor T2 is used to generate the light emitting signal EM, and the control end of the transistor T2 is coupled to the switch SW1 and receives the first control signal CTS1. The first end of the transistor T3 receives the reference voltage VGH, the second end of the transistor T3 is coupled to the second end of the transistor T2 and used to generate the light emitting signal EM, and the control end of the transistor T3 is coupled to the second control end Q3 and receives the second control signal CTS2.

Figure 3A:
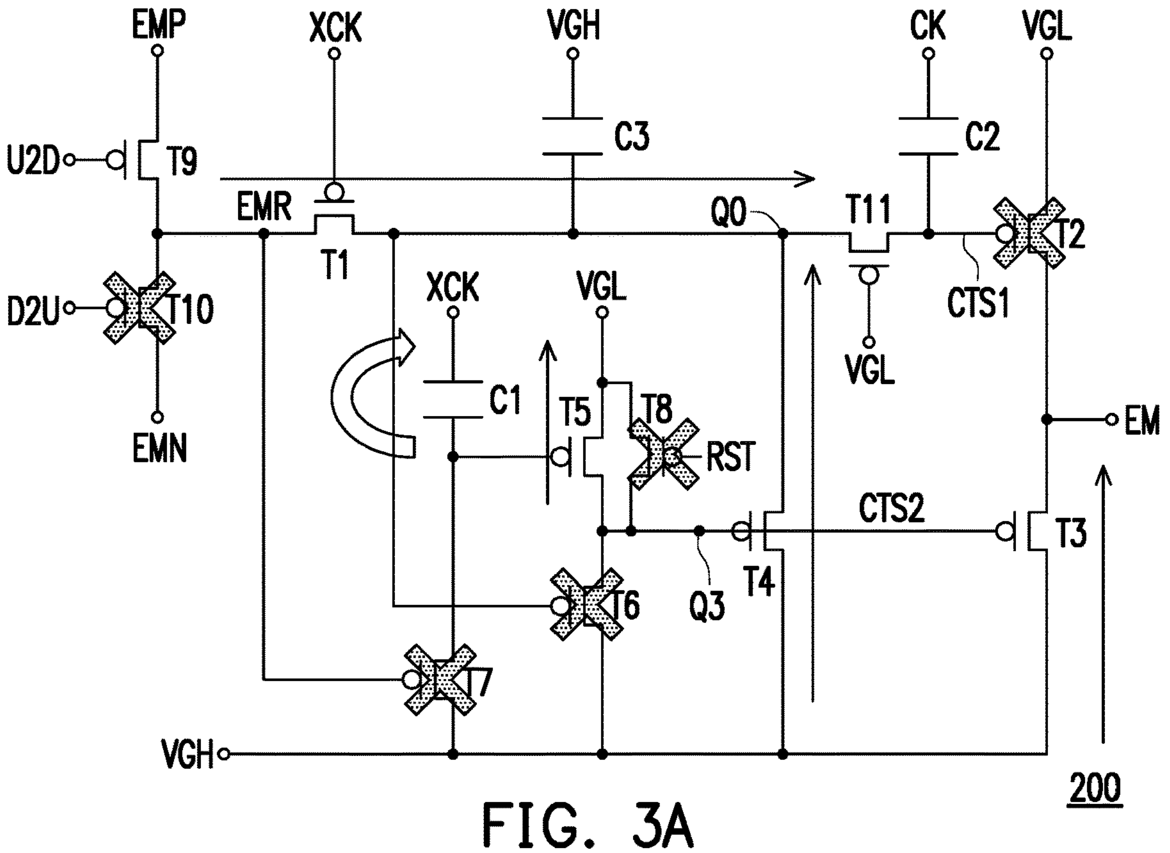
FIG. 3A to FIG. 3C show implementations of a light emitting signal generator in a stabilization period of an embodiment of the invention.
Figure 3B:
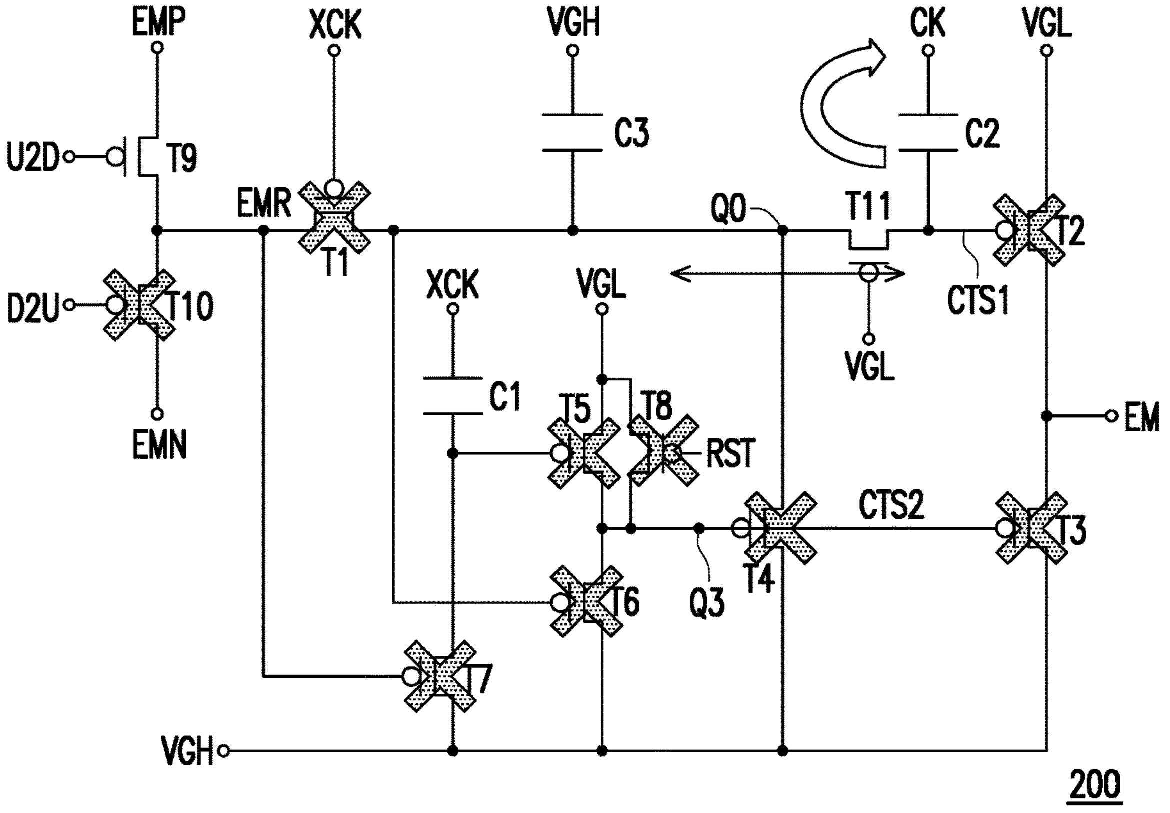
Figure 3C:
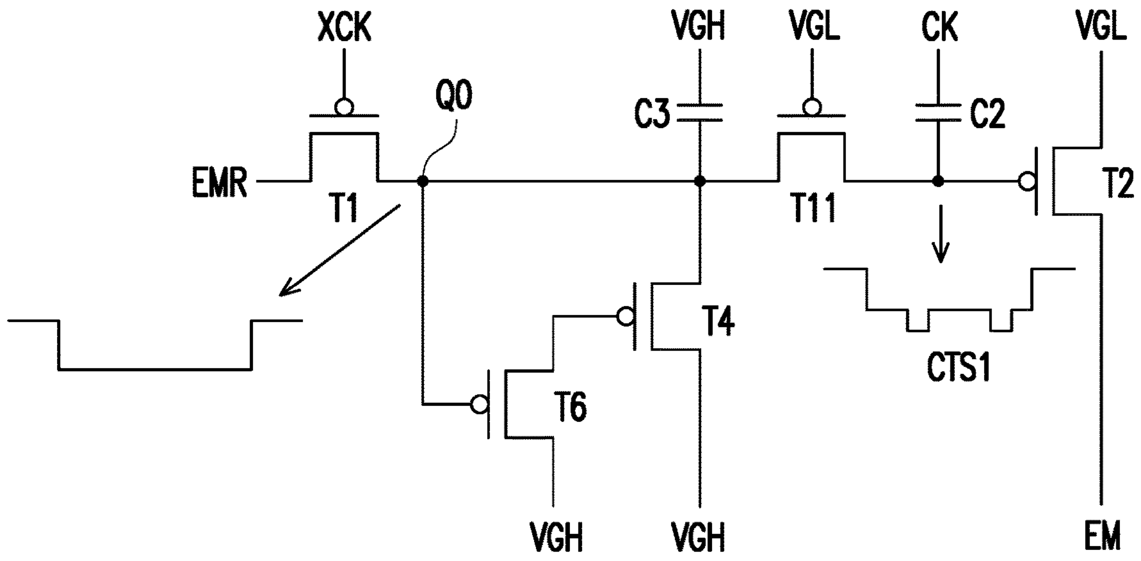
Figure 4:
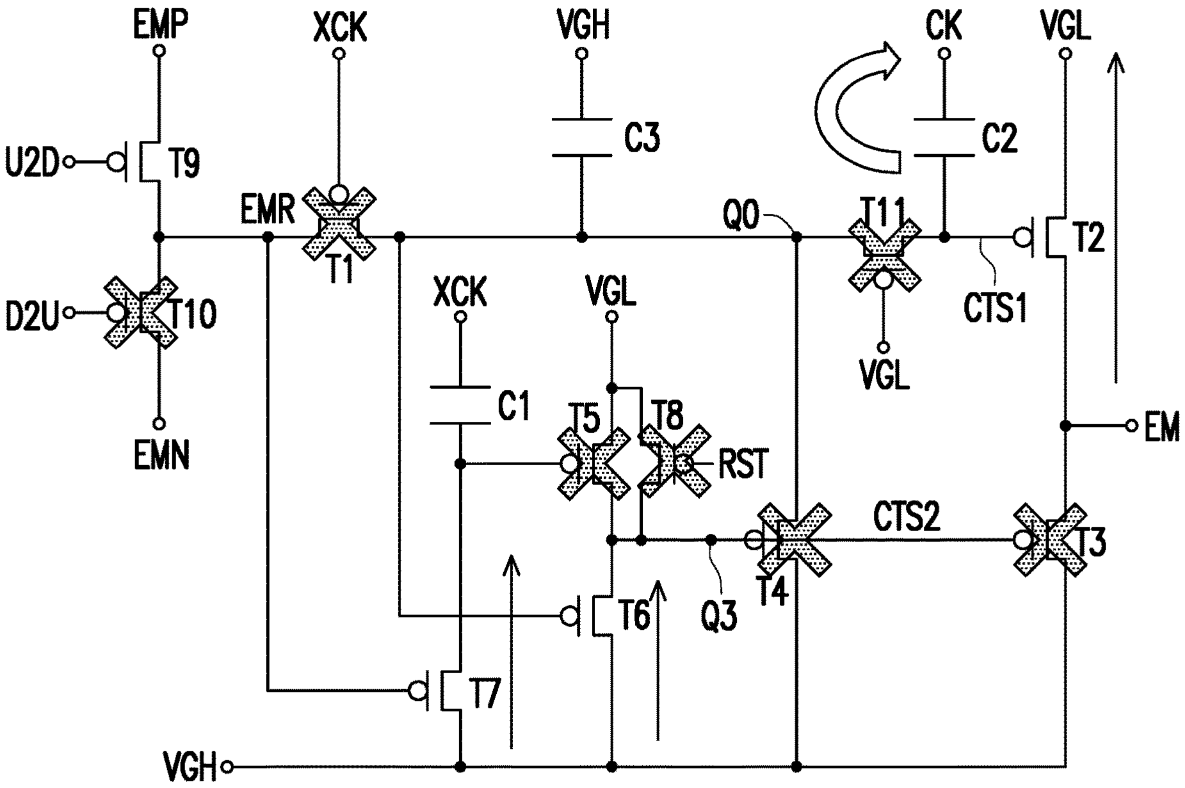
FIG. 4 shows an implementation of a light emitting signal generator in an output period of an embodiment of the invention.

For details of the operation of the light emitting signal generator 200, please refer to the following embodiments of FIG. 3A to FIG. 4. In particular, FIG. 3A to FIG. 3C show the implementation of a light emitting signal generator in a stabilization period of an embodiment of the invention, and FIG. 4 shows the implementation of a light emitting signal generator in an output period of an embodiment of the invention. In FIG. 3A, the light emitting signal generator 200 is operated in a stabilization period as an example. When the transistor T1 is turned on according to the clock signal XCK, for example, the transistor T9 is turned on (the transistor T10 is turned off), and the pre-stage light emitting signal EMP may be transmitted to the first control end Q0 via the transistor T1. When the pre-stage light emitting signal EMP is a logic high voltage, the transistor T7 is turned off. Based on the clock signal XCK is a logic low voltage at this time, the voltage on the control end of the transistor T5 is a logic low voltage, and the transistor T5 is turned on. Therefore, the second control signal CTS2 on the second control end Q3 may be equal to the reference voltage VGL, and the transistor T3 is turned on. Correspondingly, the transistor T4 may be turned on.

According to the turned-on transistor T4, the voltage on the first control end Q0 may be equal to the reference voltage VGH and is a logic high voltage. At this time, the transistor T11 as a switch is turned on, and the first control signal CTS1 is made equal to the voltage (equal to the reference voltage VGH) on the first control end Q0. In this way, the transistor T2 may be turned off.

It may be known from the above description that the light emitting signal generator 200 may generate the light emitting signal EM substantially equal to the reference voltage VGH via the turned-on transistor T3 and the turned-off transistor T2.

In FIG. 3B, the light emitting signal generator 200 continues to be operated in the stabilization period. However, since the clock signal XCK is transitioned to a logic high voltage, the transistor T1 is turned off. At this time, the transistor T11 is maintained in an on state, and the capacitor C3 and the capacitor C2 may be connected in series with each other via the transistor T11 to form a voltage divider circuit. The voltage divider circuit formed by the capacitor C3 and the capacitor C2 may divide the voltage between the reference voltage VGH and the clock signal CK to generate the first control signal CTS1. At this time, the clock signal CK is equal to the reference voltage VGL. That is, the voltage value of the first control signal CTS1 is, for example, equal to VGH+(VGH−VGL)*C2/(C2+C3).

It should be mentioned that, the capacitance value of the capacitor C3 may be equal to the capacitance value of the capacitor C2. In other embodiments of the invention, the capacitance value of the capacitor C3 may also be (slightly) larger than the capacitance value of the capacitor C2, so as to effectively reduce the voltage value of the first control signal CTS1.

In addition, according to the illustration in FIG. 3C, corresponding to FIG. 3A, when the transistor T1 is turned on, the reference light emitting signal EMR having a logic low voltage may be provided to the first control end Q0 via the transistor T1. Since an end of the capacitor C2 receives the clock signal CK, the first control signal CTS1 may correspond to the coupling effect of the clock signal CK via the capacitor C2, and is a signal having a plurality of ripples. Here, based on the series structure of the capacitor C3 and the capacitor C2, the coupling amount may be prevented from being fed back to the signal on the first control end Q0. That is to say, the voltage difference between the gate and the source to which the transistor T6 is subjected to is not enlarged, thus effectively reducing the aging rate of the transistor T6. Similarly, the voltage difference between the source and the drain of the transistor T4 is not increased due to the above coupling phenomenon, thereby reducing the risk of leakage current.

Moreover, in FIG. 4, the light emitting signal generator 200 is operated in an embodiment of an output period. At this time, the transistor T1 is turned off according to the clock signal equal to the reference voltage VGH, and the voltage on the first control end Q0 is equal to the absolute value of the reference voltage VGL plus the threshold voltage of the transistor T1. Correspondingly, the voltage value of the first control signal CTS1 may be equal to the absolute value of the reference voltage VGL plus the threshold voltage of the transistor T11, plus the difference between the threshold voltages VGL and VGH. In particular, the difference between the threshold voltages VGL and VGH contributes to the coupling amount generated by the capacitor C2 according to the clock signal CK (transitioning between the threshold voltages VGL and VGH). Correspondingly, the transistor T11 serving as the switch is in a turned off state.

Since the transistor T11 is turned off, the periodic fluctuation of the first control signal CTS1 generated due to the coupling amount of the clock signal CK via the capacitor C2 does not affect the voltage on the first control end Q0. Therefore, the cross-voltage between the gate and the source of the transistor T6 is not increased, thus effectively slowing down the aging rate. In addition, the cross-voltage between the source and drain of the transistor T4 is not increased due to the coupling amount of the clock signal CK via the capacitor C2, thus reducing the leakage current that may be generated and enabling the output capability of the transistor T2 to remain stable.

It should be mentioned that, in the present embodiment, the transistors T1 and T11 may have the same threshold voltage. Moreover, the second control signal CTS2 is equal to the reference voltage VGH, and the voltage on the control end of the transistor T5 may also be equal to the reference voltage VGH. In the output period, the transistor T2 is turned on, and the transistor T3 is turned off, and the light emitting signal generator 200 may generate the light emitting signal EM equal to the reference voltage VGL.

Figure 5:
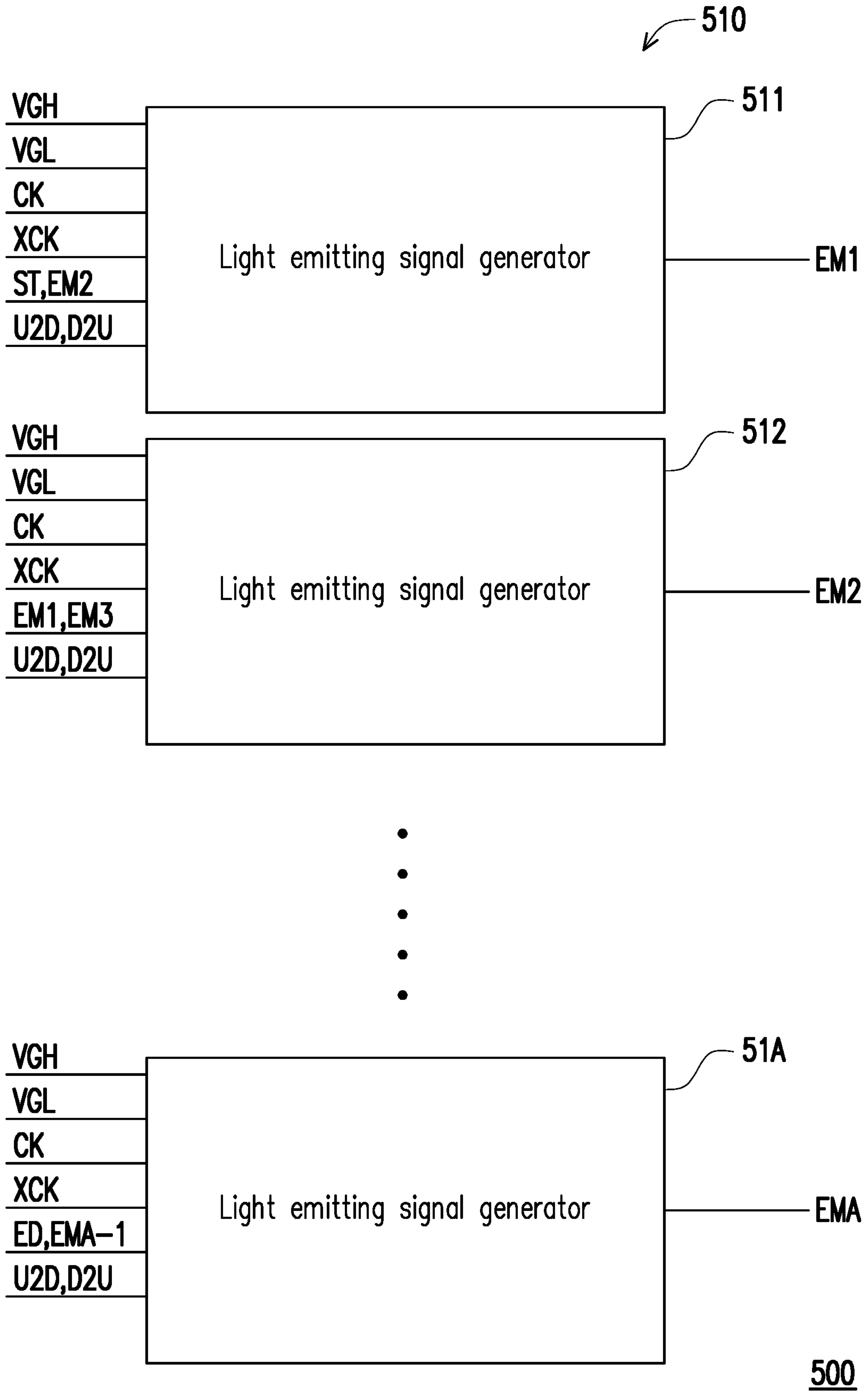
FIG. 5 shows a schematic diagram of a display panel of an embodiment of the invention.

Please refer to FIG. 5 below. FIG. 5 shows a schematic diagram of a display panel of an embodiment of the invention. A display panel 500 includes a light emitting driver 510. The light emitting driver 510 is used to generate a plurality of light emitting signals EM1 to EMA. In particular, the light emitting signals EM1 to EMA are used to drive a plurality of corresponding light emitting diodes respectively. The light emitting driver 510 includes a plurality of light emitting signal generators 511 to 51A, and the light emitting signal generators 511 to 51A may be coupled in the form of shift registers. Each of the light emitting signal generators 511 to 51A may be implemented by applying any of the light emitting signal generators in the above embodiments, and operation details are not repeated herein.

In the present embodiment, the light emitting signal generator 511 of the first stage may receive the reference voltages VGH and VGL, the clock signals XCK and CK, the selection signals U2D and D2U, a start signal ST, and a light emitting signal EM2 generated by a light emitting signal generator 512 of the first stage. The light emitting signal generator 511 of the first stage may select the start signal ST or the light emitting signal EM2 as the reference light emitting signal according to the selection signals U2D and D2U, and generate the light emitting signal EM1 based on the reference voltages VGH and VGL and the clock signals XCK and CK.

Moreover, in the present embodiment, the light emitting signal generator 512 of the intermediate stage (second stage) may receive the reference voltages VGH and VGL, the clock signals XCK and CK, the selection signals U2D and D2U, the light emitting signal EM1 generated by the light emitting signal generator 511 of the first stage (pre-stage), and a light emitting signal EM3 generated by the light emitting signal generator of the third stage (post-stage). The light emitting signal generator 512 of the first stage may select the light emitting signal EM1 or the light emitting signal EM3 as the reference light emitting signal according to the selection signals U2D and D2U, and generate the light emitting signal EM2 based on the reference voltages VGH and VGL and the clock signals XCK and CK.

The light emitting signal generator 51A of the last stage (stage A) may receive the reference voltages VGH and VGL, the clock signals XCK and CK, the selection signals U2D and D2U, a light emitting signal EMA-1 generated by the light emitting signal generator of the A-1 stage (pre-stage), and an end signal ED. The light emitting signal generator 512 of the first stage may select the light emitting signal EMA-1 or the end signal ED as the reference light emitting signal according to the selection signals U2D and D2U, and generate the light emitting signal EMA based on the reference voltages VGH and VGL and the clock signals XCK and CK.

In the present embodiment, the light emitting signals EM1 to EMA may be sequentially enabled, wherein, in an embodiment of the invention, each of the light emitting signals EM1 to EMA is in an enabled state when equal to the reference voltage VGL.

Based on the above, in the light emitting signal generator of the invention, the switch is disposed between the output stage circuit and the first control end. By cutting off the switch, the voltage coupling amount generated by the transition phenomenon of the clock signal on the output stage circuit may be prevented from interfering with the operation of other circuit elements. In the light emitting signal generator of the invention, the capacitor is disposed on the first control end, so that the capacitor and the capacitor in the output stage circuit produce a voltage divider effect to effectively reduce the voltage value on the first control end in the stabilization period, and reduce the influence of the voltage coupling amount generated by the transition phenomenon of the clock signal. As a result, the aging rate of the elements of the light emitting signal generator may be reduced, and the output stability thereof may be improved, thereby effectively improving the reliability of the light emitting signal generator and the corresponding display panel.

What is claimed is:

1. A light emitting signal generator, comprising:

an output stage circuit generating a light emitting signal according to a first control signal and a second control signal;

a first control signal generator coupled to the output stage circuit and a first control end and generating a first control signal at the first control end according to a reference light emitting signal, a first clock signal, a first reference voltage, and a second reference voltage;

a second control signal generator coupled to the output stage circuit and a second control end and generating a second control signal at the second control end according to the reference light emitting signal, the first clock signal, the first reference voltage, and the second reference voltage; and a switch coupled between the first control end and the output stage circuit, wherein a control end of the switch receives the second reference voltage, wherein in an output period, the switch is turned off to isolate the output stage circuit from the first control end.

2. The light emitting signal generator of claim 1, wherein the first reference voltage is higher than the second reference voltage.

3. The light emitting signal generator of claim 1, wherein the output stage circuit comprises:

a first transistor having a first end receiving the second reference voltage, wherein a control end of the first transistor is coupled to the switch, and a second end of the switch generates the light emitting signal;

a capacitor having a first end receiving a second clock signal, wherein a second end of the capacitor is coupled to the control end of the first transistor; and a second transistor having a first end receiving the first reference voltage, wherein a control end of the second transistor is coupled to the second control end, and a second end of the second transistor is coupled to a second end of the first transistor, wherein the first clock signal is an inverse signal of the second clock signal.

4. The light emitting signal generator of claim 1, wherein the first control signal generator comprises:

a first transistor having a first end for receiving a reference light emitting signal, wherein a control end of the first transistor receives the first clock signal, and a second end of the first transistor is coupled to the first control end; and a second transistor having a first end coupled to the first control end, wherein a control end of the second transistor is coupled to the second control end, and a second end of the second transistor receives the second reference voltage.

5. The light emitting signal generator of claim 1, wherein the second control signal generator comprises:

a first transistor having a first end to receive the second reference voltage, wherein a second end of the first transistor is coupled to the second control end;

a second transistor having a first end coupled to the second end of the first transistor, wherein a control end of the second transistor is coupled to the first control end, and a second end of the second transistor receives the second reference voltage;

a third transistor having a first end coupled to a control end of the first transistor, wherein a control end of the third transistor receives the reference light emitting signal, and a second end of the third transistor receives the second reference voltage; and a capacitor having a first end receiving the first clock signal, wherein a second end of the capacitor is coupled to the control end of the first transistor.

6. The light emitting signal generator of claim 1, wherein the second control signal generator further comprises:

a fourth transistor coupled in parallel with the first transistor and controlled by a reset voltage.

7. The light emitting signal generator of claim 1, further comprising:

a signal selector selecting a pre-stage light emitting signal or a post-stage light emitting signal to generate the reference light emitting signal.

8. A display panel, comprising:

a light emitting driver comprising a plurality of light emitting signal generators, wherein each of the light emitting generators comprises:

an output stage circuit generating a light emitting signal according to a first control signal and a second control signal;

a first control signal generator coupled to the output stage circuit and a first control end and generating a first control signal at the first control end according to a reference light emitting signal, a first clock signal, a first reference voltage, and a second reference voltage;

a second control signal generator coupled to the output stage circuit and a second control end and generating a second control signal at the second control end according to the reference light emitting signal, the first clock signal, the first reference voltage, and the second reference voltage; and a switch coupled between the first control end and the output stage circuit, wherein a control end of the switch receives the second reference voltage, wherein in an output period, the switch is turned off to isolate the output stage circuit from the first control end.

9. The display panel of claim 8, wherein the output stage circuit comprises:

a first transistor having a first end receiving the second reference voltage, wherein a control end of the first transistor is coupled to the switch, and a second end of the switch generates the light emitting signal;

a capacitor having a first end receiving a second clock signal, wherein a second end of the capacitor is coupled to the control end of the first transistor; and a second transistor having a first end receiving the first reference voltage, wherein a control end of the second transistor is coupled to the second control end, and a second end of the second transistor is coupled to a second end of the first transistor.

10. The display panel of claim 8, wherein the reference light emitting signal is a pre-stage light emitting signal, a post-stage light emitting signal, or a start signal.

* * * * *